J. A. MARSHALL.
STALK BREAKER.
APPLICATION FILED OCT. 19, 1912.
1,064,233.
Patented June 10, 1913.
2 SHEETS—SHEET 2.
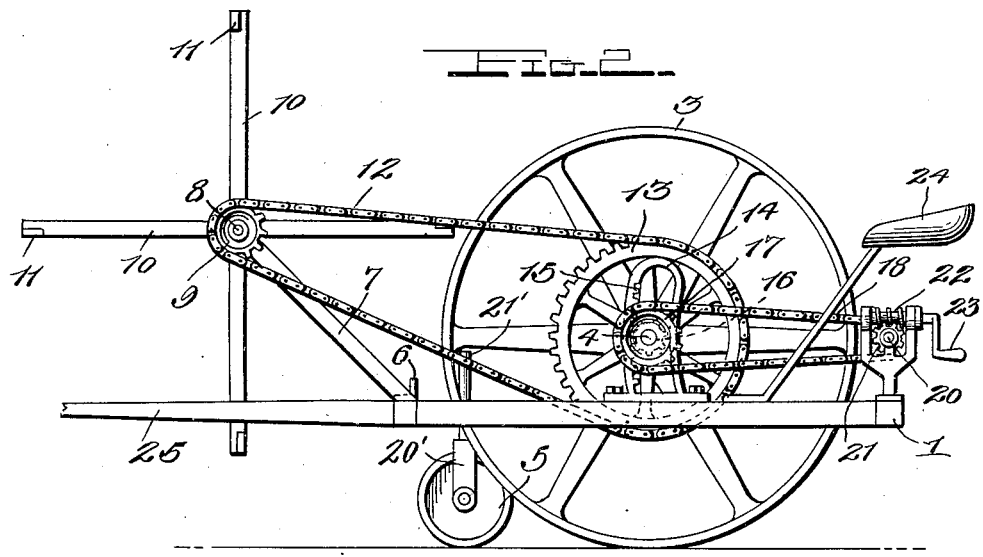
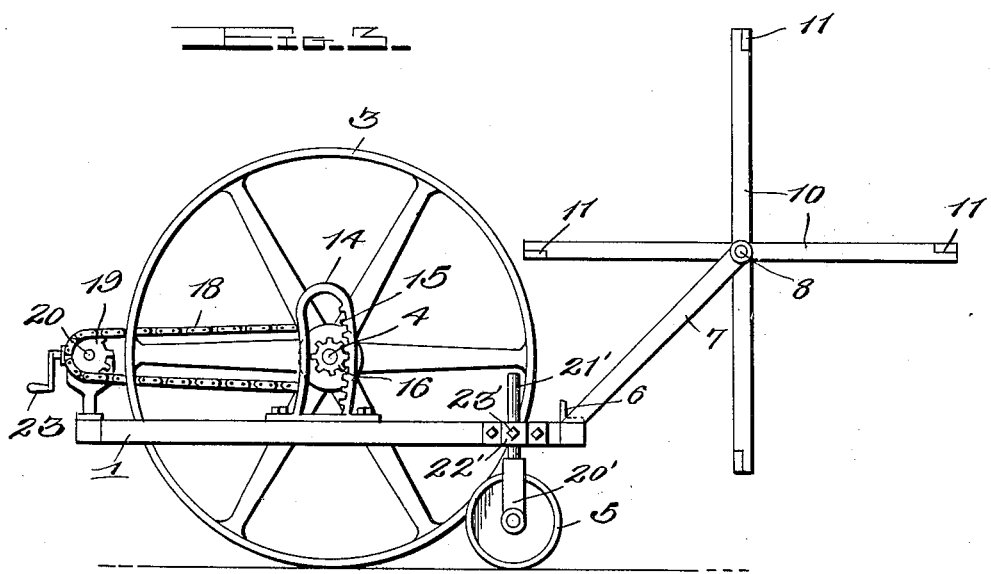
Witnesses
Chas. L. Griesbauer.
A. J. Hind.
Inventor
J. A. Marshall,
By Watson E. Coleman
Attorney

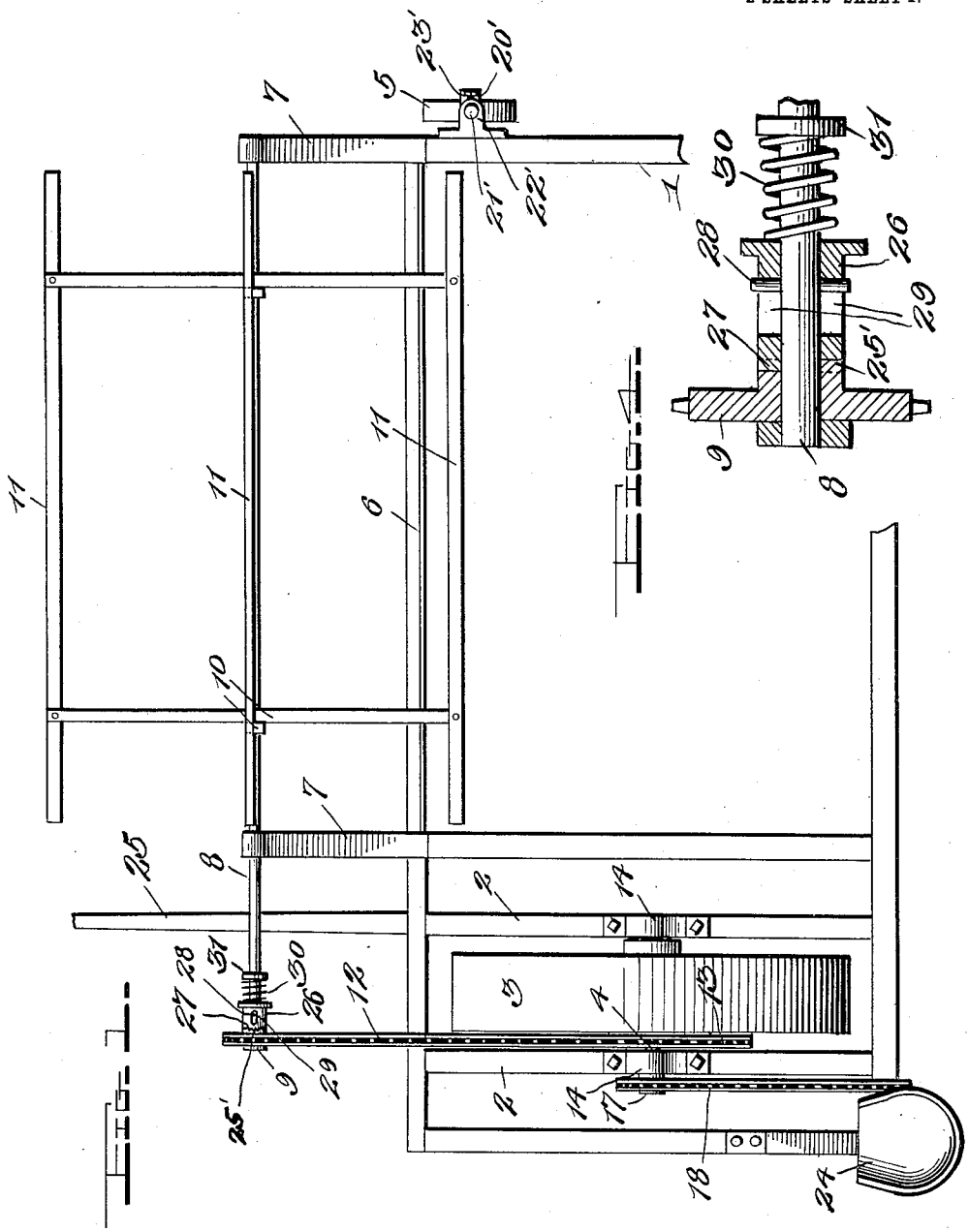

UNITED STATES PATENT OFFICE.

JAMES A. MARSHALL, OF CORDELL, OKLAHOMA.

STALK-BREAKER.

1,064,233.  Specification of Letters Patent.  Patented June 10, 1913.

Application filed October 19, 1912. Serial No. 726,781.

*To all whom it may concern:*

Be it known that I, JAMES A. MARSHALL, a citizen of the United States, residing at Cordell, in the county of Washita and State of Oklahoma, have invented certain new and useful Improvements in Stalk-Breakers, of which the following is a specification, reference being had to the accompanying drawings.

This invention relates to new and useful improvements in devices for breaking or flailing stalks and more particularly to a cotton stalk flailer or breaker and the primary object of the invention is to provide a device of this character which will break the stalks at points above the roots thereof and which will not engage the soil, during such operation.

A further object of the invention resides in providing a device which will break the stalks from more than one row at a time and a still further object is to provide a means whereby the device may be adjusted to break the stalks at various points above the roots thereof according to the nature of the soil and the conditions of the crop to be destroyed.

A further object of the invention is to provide a device which will be most positive in its action for carrying out the purposes for which the device is designed and a still further object is to provide a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawings forming a part of this application, Figure 1 is a plan view of the device. Fig. 2 is a side elevation thereof. Fig. 3 is an opposite side elevation of the same; and Fig. 4 is a section through the shaft forming the axle for the reel, showing the clutch mechanism thereon.

In describing my invention, I shall refer to the drawings in which similar reference characters designate corresponding parts throughout the several views and in which—

1 indicates a rectangular frame formed preferably of metal and of such size as is usually used in devices of this character, and extending longitudinally of the frame on the one side thereof and connecting the front and rear bars of the same, is a plurality of additional bars 2. Disposed between a pair of these bars 2 or about centrally thereof, is the enlarged supporting wheel 3, to the axle 4 of which is adjustably connected the frame 1, in a manner to be hereinafter and more particularly described. On the opposite side of the frame and adjustably mounted thereon, in a manner to be hereinafter described, is a smaller and additional supporting wheel, sometimes called the grain wheel 5.

The forward or front bar 6 of the frame 1, is formed of angle iron, the inner angle thereof being faced forwardly, and supported forwardly thereabove through the medium of the inclined supporting arms 7, which are carried on the frame 1, is a rotatable shaft 8, said shaft having a sprocket wheel 9 loosely mounted thereon adjacent one end thereof. This rotatable shaft 8 forms the axis of a chopping or beating reel which consists of the radial bars 10 and the peripheral bars 11 secured in any desired manner to the outer ends of said radial bars. As stated, the shaft 7 is disposed immediately over the forward angle bar 6 of the frame 1, and the radial bars 10 are of such length as to dispose the peripheral bars 11 of said reel in close proximity with said forward bar, as said reel is rotated.

In order to rotate the reel, a drive chain 12 is extended over the sprocket 9 on the shaft 8 and an enlarged sprocket 13 is mounted on the axle 4 in connection with the wheel 3. This drive chain 12 is also extended over the sprocket 13 so that as the device is propelled, said shaft 8 and the reel formed thereon may be rotated therewith.

As previously stated, the frame 1, is adjustably mounted in connection with the axles of the wheels 3 and 5, and in describing this construction, I shall first refer to the means in connection with the wheel 3. Mounted on the pair of bars between which the wheel 3 is disposed are the arcuate slotted plates 14, the one wall in the slot of each plate being provided with rack teeth 15 and loosely mounted on the axle 4 at each end thereof, is a pinion 16, the teeth of which are meshed with the aforesaid rack teeth. Mounted in connection with one of said pinions 16, is a sprocket 17 over which extends a chain 18 and an additional sprocket 19, which is carried on a stub shaft 20 on the frame 1 also has the chain 18 extending thereover. This stub shaft 20 also carries thereon a worm gear 21 with which is meshed a worm screw 22 having the crank 23 thereon. Thus as the crank 23 is turned in one direction or the other, the frame may be raised or lowered with respect to the axle of the wheel and if desired, a means may be provided to lock the crank 23 against rotation. The axle of the wheel 5 on the opposite side of the frame 1 is rotatably mounted in the forked end 20' of a rod or shaft 21', said latter rod or shaft being adjustably mounted in a bearing 22' carried on the frame 1. A set screw 23' which extends through the bearing 22' is adapted to secure the shaft or rod 21' in any adjusted position and thus this side of the frame may be also adjusted with respect to the surface of the ground. While I have shown this particular means for raising and lowering this side of the frame, this means being particularly well adapted to the small wheel 5, it will be understood that the means shown in connection with the wheel 3 or any other desired means, within the scope of the appended claim, may be provided. Also mounted on the frame 1, adjacent the wheel 3, is a seat 24 and on the same side of the frame extending from the forward end thereof, is a draft bar 25.

As stated, the sprocket 9 is loosely mounted on the shaft 8 which forms the axis of the reel and the inner face thereof is provided with inclined ratchet teeth 25'. Slidably mounted on the shaft 8 adjacent the sprocket is a collar or sleeve 26, the one end of which is provided with additional ratchet teeth 27 adapted for engagement with the teeth 25 of the gear and the sliding movement of this collar or sleeve is limited by means of a pin 28 which extends transversely through the shaft and through slots 29 in said collar or sleeve. A coil spring 30 which encircles said shaft 8 has one end thereof in engagement with the collar 31 on said shaft and the opposite end in engagement with the collar 26 to normally force the same in engagement with the sprocket so that as said sprocket is rotated in one direction, the collar and correspondingly the shaft 8 will be rotated therewith. The ratchet teeth 25 and 27, however, are so inclined that when the sprocket 9 is rotated in the opposite direction, it will not affect the collar and shaft. Thus, it will be appreciated that during the operation of the device, when the same is brought to a sudden stop, the clutch will be substantially automatically released so as not to cause the driving chain and various other parts to be injured.

In operation, the device is driven through a cotton field from which stalks are desired to be removed. As the device is propelled, it is obvious that stalks will contact with the forward angle bar 6 on the frame 1, and as the reel is being rotated through the propulsion of the device, the peripheral bars 11 thereof will strike said stalks and break the same over said bar 6. It will, of course, be understood that as much of the stalks as is desired by the mere adjustment of the frame 1, with respect to the axles of the wheels 3 and 5, but it will, of course, be understood that the frame is usually disposed quite close to the surface of the ground so as to allow but a small portion of the stalks to remain projecting thereabove.

It will be seen that throughout the operation of the device, no portion of the beating or breaking mechanism will contact with the surface of the ground so that the same will not be injurious to growing wheat or oats, nor can the same become clogged with wet soil, as is the case with most of the devices now in use. It will further be seen that more than one row of stalks can be broken simultaneously with the same horse power used to ordinarily remove one row at a time. It will still further be seen that the device is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

A stalk breaker comprising a frame, the forward bar of which constitutes a stalk gathering bar, supporting wheels for the frame, means to adjustably mount said frame on said wheels, a pair of forwardly inclined supporting arms carried on said frame, the free ends of which terminate in bearings in a plane forward of the vertical plane of said forward bar of the frame, and a reel rotatably mounted in the bearings of said supporting arms, the peripheral bar of said reel being adapted to extend in close proximity to said forward bar as the reel is rotated.

In testimony whereof I hereunto affix my signature in the presence of two witnesses.

JAMES A. MARSHALL.

Witnesses:
.A. M. BETTS,
W. G. BRAYFIELD.

Copies of this patent may be obtained for five cents each, by addressing the "Commissioner of Patents, Washington, D. C."